(12) United States Patent
Tashiro et al.

(10) Patent No.: US 10,495,473 B2
(45) Date of Patent: *Dec. 3, 2019

(54) ROUTE SEARCH APPARATUS, ROUTE SEARCH METHOD, COMPUTER READABLE STORAGE MEDIUM STORING A PROGRAM AND DATA STRUCTURE

(71) Applicants: ZENRIN Co., LTD., Kitakyushu-shi (JP); TOYOTA JIDOSHA KABUSHIKI KAISHA, Toyota-shi (JP); AISIN AW Co., LTD., Anjo-shi (JP)

(72) Inventors: Hiroyuki Tashiro, Kitakyushu (JP); Tomohiko Masutani, Kitakyushu (JP); Yukiko Hiroo, Kitakyushu (JP); Motohiro Nakamura, Okazaki (JP); Tomoki Kodan, Nagoya (JP); Atsushi Ikeno, Minato-ku (JP); Yoshitaka Kato, Minato-ku (JP); Sadahiro Koshiba, Takahama (JP); Kazuteru Maekawa, Miyoshi (JP); Koichi Ushida, Okazaki (JP)

(73) Assignees: ZENRIN Co., LTD., Kitakyushu-shi (JP); TOYOTA JIDOSHA KABUSHIKI KAISHA, Toyota-shi (JP); AISIN AW Co., LTD., Anjo-shi (JP)

(*) Notice: Subject to any disclaimer, the term of this patent is extended or adjusted under 35 U.S.C. 154(b) by 54 days.

This patent is subject to a terminal disclaimer.

(21) Appl. No.: 15/867,292

(22) Filed: Jan. 10, 2018

(65) Prior Publication Data

US 2018/0128629 A1 May 10, 2018

Related U.S. Application Data

(63) Continuation of application No. 15/119,667, filed as application No. PCT/JP2015/000722 on Feb. 17, 2015, now Pat. No. 9,903,729.

(30) Foreign Application Priority Data

Feb. 21, 2014 (JP) .................................. 2014-031410

(51) Int. Cl.
*G01C 21/34* (2006.01)
*G01C 21/00* (2006.01)
(Continued)

(52) U.S. Cl.
CPC ......... *G01C 21/3446* (2013.01); *G01C 21/32* (2013.01); *G06F 16/9027* (2019.01)

(58) Field of Classification Search
CPC .... G01C 21/32; G01C 21/3492; G06N 5/003; H04L 45/10
See application file for complete search history.

(56) References Cited

U.S. PATENT DOCUMENTS

2007/0189170 A1* 8/2007 Pirbhai ................... H04L 45/10
370/237
2007/0198178 A1* 8/2007 Trimby .................. G06N 5/003
701/533
(Continued)

FOREIGN PATENT DOCUMENTS

JP 2009-180500 A 8/2009
JP 2012-3343 A 1/2012
(Continued)

OTHER PUBLICATIONS

International Search Report dated May 26, 2015 in PCT/JP15/000722 Filed Feb. 17, 2015, Filed with U.S. Appl. No. 15/119,667.
(Continued)

*Primary Examiner* — Yuri Kan
(74) *Attorney, Agent, or Firm* — Oblon, McClelland, Maier & Neustadt, L.L.P.

(57) ABSTRACT

A route search apparatus comprises a road information storage part configured to store road information including
(Continued)

link information comprised of single link information and composite link information; and a route searcher configured to search a recommended route between two different points using the link information. The single link information includes information regarding an approach link that is a link approaching to a node at one end of a target link, an exit link that is a link exiting from a node at the other end of the target link, and a cost of the target link for entering from the approach link and exiting to the exit link. The composite link information includes information regarding an approach link that is a link approaching to a node at one end of a target link array, an exit link that is a link exiting from a node at the other end of the target link array, and a cost of the target link array for entering from the approach link and exiting to the exit link.

8 Claims, 17 Drawing Sheets

(51) Int. Cl.
*G01C 21/36* (2006.01)
*G08G 1/00* (2006.01)
*H04L 12/26* (2006.01)
*G06F 16/901* (2019.01)
*G01C 21/32* (2006.01)

(56) References Cited

U.S. PATENT DOCUMENTS

2010/0049428 A1* 2/2010 Murata .............. G01C 21/3492
 701/118
2013/0345955 A1* 12/2013 Tashiro .................. G01C 21/32
 701/118

FOREIGN PATENT DOCUMENTS

JP 2013-96713 A 5/2013
JP 2008-210249 A 2/2015

OTHER PUBLICATIONS

Office Action dated Jul. 5, 2017 in co-pending U.S. Appl. No. 15/119,667, 17 pages.
Notice of Allowance dated Oct. 18, 2017 in co-pending U.S. Appl. No. 15/119,667, 9 pages.

* cited by examiner (1) IT IS ASSUMED THAT LABEL LB2 PROVIDED TO NODE N2 IS FIXED:

LABEL DESCRIPTION:

| LABEL NUMBER (TARGET LINK, EXIT LINK, PREVIOUS LABEL NUMBER, CUMULATIVE COST) |

FIXED LABEL:

LABEL DESCRIPTION:

| LABEL NUMBER (TARGET LINK, EXIT LINK, PREVIOUS LABEL NUMBER, CUMULATIVE COST) |
| --- |

FIXED LABEL: ⬜
CANDIDATE LABEL: ⬜

| LABEL NO. | NODE NO. | TARGET LINK | EXIT LINK | PREVIOUS LABEL | COST | CUMULATIVE COST |
|---|---|---|---|---|---|---|
| LB1 (FIXED) | N1 | L1 | L2 | – | 2 | 2 |
| LB2 (FIXED) | N2 | L2 | L3 | LB1 | 5 | 7 |
| LB4 | N3 | L2-L3 | L6 | LB1 | 20 | 22 |
| LB3 | N3 | L3 | L6 | LB2 | 10 | 17 |
| LB5 (FIXED) | N2 | L8 | L3 | – | 5 | 10 |

| LABEL NO. | NODE NO. | TARGET LINK | EXIT LINK | PREVIOUS LABEL | COST | CUMULATIVE COST |
|---|---|---|---|---|---|---|
| LB1(FIXED) | N1 | L1 | L2 | – | 2 | 2 |
| LB2(FIXED) | N2 | L2 | L3 | LB1 | 5 | 7 |
| LB4 | N3 | L2=L3 | L6 | LB1 | 20 | 22 |
| LB3 | N3 | L3 | L6 | LB2 | 10 | 17 |
| LB5(FIXED) | N2 | L8 | L3 | – | 5 | 10 |
| LB6 | N2 | L3 | L6 | LB5 | 10 | 20 |

ROUTE SEARCH APPARATUS, ROUTE SEARCH METHOD, COMPUTER READABLE STORAGE MEDIUM STORING A PROGRAM AND DATA STRUCTURE

CROSS-REFERENCE TO RELATED APPLICATIONS

The present application is a continuation of U.S. application Ser. No. 15/119,667, filed on Aug. 17, 2016, which is a National Stage of PCT/JP2015/000722, filed on Feb. 17, 2015, and claims priority from Japanese patent application No. 2014-31410, filed on Feb. 21, 2014, the entire contents of each of which is hereby incorporated by reference into this application.

TECHNICAL FIELD

The present invention relates to a technique of searching a route.

BACKGROUND ART

A technique for searching a route that avoids heavy traffic at an intersection has been proposed recently. For example, JP 2009-180500A and JP 2012-3343A disclose techniques that set different costs in one road district between intersections with regard to each exit direction or each approach direction. These techniques set different costs to one road, for example, in the case of turning right and in the case of going straight. This allows for search of a route that avoids right-turn congestion in the region of left-hand traffic.

SUMMARY

Technical Problem

The traffic congestion is, however, not limited in one road district between intersections. For example, a right-turn congestion may occur across a plurality of road districts (shown in FIG. 6 of JP 2009-180500A). In order to address this problem, in the case where a right-turn congestion occurs over two districts ("target link" and "upstream link"), the technique disclosed in JP 2009-180500A sets in advance a link immediately before a right turn as a correction link to correct a cost during route search. There is, however, a high demand for the technique of searching an optimum route. There is accordingly a need for a technique allowing for search of a route that avoids heavy traffic with the higher accuracy than the technique of JP 2009-180500A.

This problem is not limited to right-turn congestion in the region of left-hand traffic but similarly occurs in the case of left-turn congestion in the region of right-hand traffic. Other needs over the prior art route search apparatus include, for example, improvement of the processing efficiency, downsizing of the apparatus, cost reduction, resource saving and improvement of the convenience.

Solution to Problem

In order to solve at least part the problems described above, the invention may be implemented by aspects described below.

(1) According to one aspect of the invention, there is provided a route search apparatus. this route search apparatus may comprise a road information storage part configured to store road information including network data that includes nodes and links representing a road network, and link information comprised of single link information that is information related to a target link corresponding to one link and composite link information that is information related to a target link array corresponding to a plurality of links arranged across at least one node; and a route searcher configured to extend a search tree through the nodes and the links based on the road information, provide a node of interest ahead of the search tree with a cumulative cost to the node of interest, and fix a cumulative cost that satisfies a predetermined condition among the cumulative costs provided to the node of interest, so as to search a recommended route between two different points. The single link information may include information regarding an approach link that is a link approaching to a node at one end of the target link, an exit link that is a link exiting from a node at the other end of the target link, and a cost of the target link for entering from the approach link and exiting to the exit link. The composite link information may include information regarding an approach link that is a link approaching to a node at one end of the target link array, an exit link that is a link exiting from a node at the other end of the target link array, and a cost of the target link array for entering from the approach link and exiting to the exit link. The route searcher may obtain link information including an exit link of a fixed node that is a node having a cumulative cost fixed in advance as its target link and a target link reaching the fixed node as its approach link, from the road information and extend the search tree to a node that is located at the other end of the target link or target link array included in the obtained link information. In the route search apparatus of this aspect, each of the single link information and the composite link information includes information indicating the approach link and the exit link, and the composite link information includes the target link array that represents a road across one or more node by a plurality of target links. Relating a cost affected by heavy traffic across a plurality of road districts to the composite link information enables a route to be searched with high accuracy based on the accurate cost even when a right-turn congestion, a left-turn congestion or the like affects multiple links.

(2) In the route search apparatus of the above aspect, when the road information storage part stores one piece of composite link information, the road information storage part may additionally store another piece of composite link information that includes an identical approach link and an identical target link array with an approach link and a target link array of the one piece of composite link information but has a different exit link from an exit link of the one piece of composite link information. The road information storage part may not store link information that includes an identical approach link with the approach link of the one piece of composite link information and has all target links and an exit link that are included in the target link array of the one piece of composite link information. This configuration prevents a route expressed by composite link information from being expressed by a combination of multiple pieces of link information corresponding to shorter districts. This causes the cost set in the composite link information to be appropriately reflected in route search and thereby enables a route that avoids the heavy traffic to be appropriately searched.

(3) In the route search apparatus of the above aspect, when multiple pieces of link information having an identical exit link are present at the node of interest and routes by the multiple pieces of link information match with each other, the route searcher may provide a cumulative cost to the node of interest, based on a cost of link information that includes a largest number of target links among the multiple pieces of link information. This configuration ensures route search based on the composite link information including a larger number of target links than the single link information. This causes the cost set in the composite link information to be appropriately reflected in route search and thereby enables a route that avoids the heavy traffic to be appropriately searched.

(4) In the route search apparatus of the above aspect, when one piece of link information and another piece of link information included in the multiple pieces of link information having the identical exit link have such a relationship that a target link and an approach link of the another piece of link information are included in a target link and an approach link of the one piece of link information, the route searcher may determine that a route by the one piece of link information matches with a route by the another piece of link information. This configuration has no need to determine whether the entire route to the node of interest with regard to the one piece of link information matches with the entire route to the node of interest with regard to the another piece of link information. This ensures efficient route search.

The invention may be implemented by various aspects other than the route search apparatus, for example, a route search method, a computer program, a data structure or a non-transitory physical recording medium in which the computer program or the data structure is recorded.

DESCRIPTION OF EMBODIMENTS

A. First Embodiment

Figure 1:
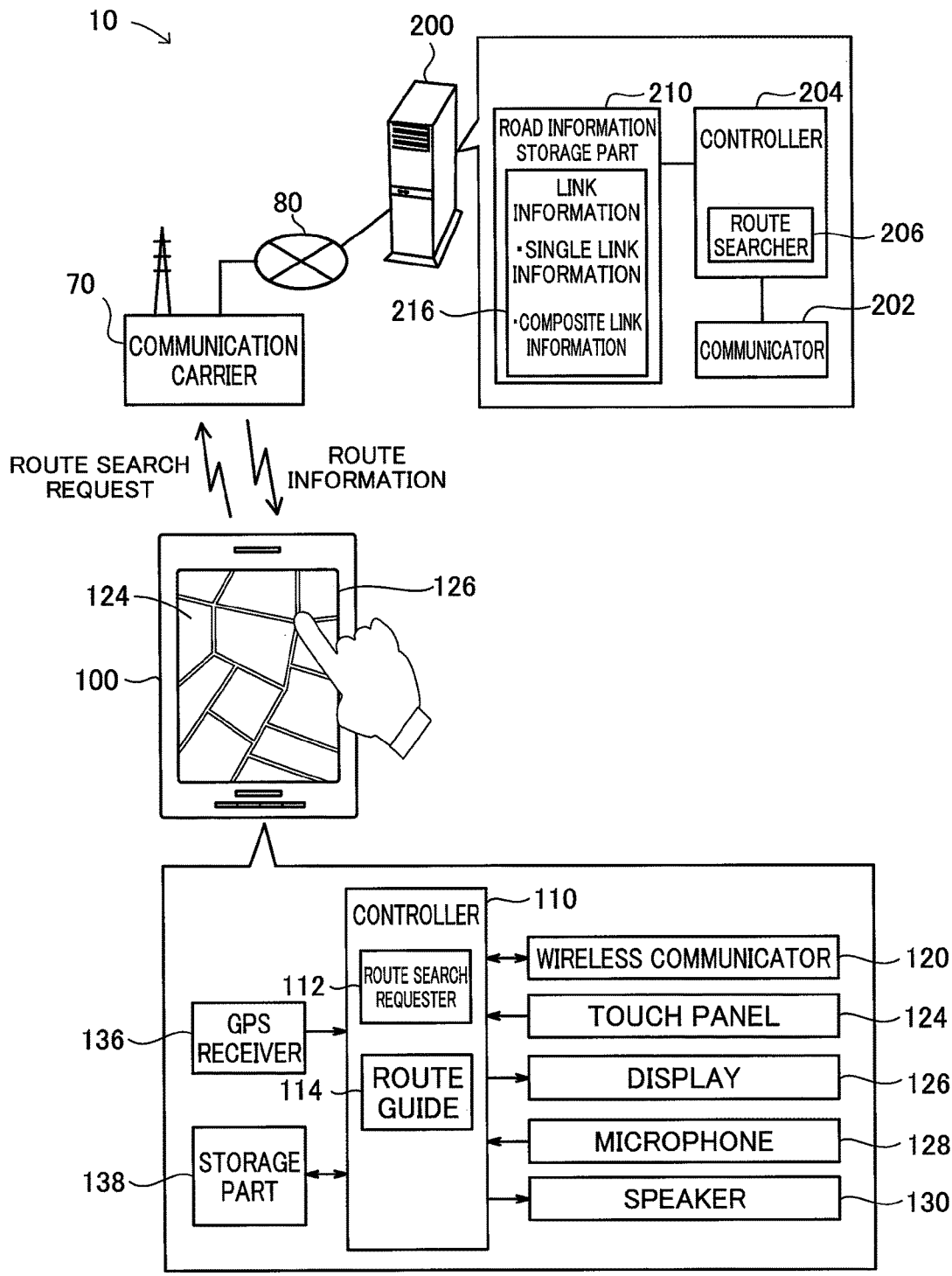
FIG. 1 is a diagram illustrating the schematic configuration of a route search system.

FIG. 1 is a diagram illustrating the schematic configuration of a route search system 10 including a route search apparatus 20 according to a first embodiment of the invention. The route search system 10 includes a smartphone 100 as a terminal device and the route search apparatus 20 configured as a server device. The smartphone 100 can make access to the route search apparatus 200 connected to the Internet 80, via a communication carrier 70 including a transmitting/receiving antenna, a wireless base station and a switching station. Although only one smartphone 100 is illustrated in FIG. 1, the route search system 10 may include a plurality of the smartphones 100.

The smartphone 100 includes a controller 110, a wireless communicator 120, a touch panel 124, a display 126, a microphone 128, a speaker 130, a GPS receiver 136 and a storage part 138.

The wireless communicator 120 is a circuit configured to make data communication and voice communication via the communication carrier 70. The display 126 is a device configured to display various images such as map images. The touch panel 124 is provided to be superposed on the display 126 and is configured to receive the user's touch operations with a finger or a pen. The GPS receiver 136 is configured to identify the current location (longitude and latitude) of the smartphone 100 (user), based on radio waves received from satellites constituting a GPS (global positioning system). The microphone 128 is configured to receive the user's voice during voice communication. The speaker 130 is configured to output the voice for route guidance and the voice received from an opposite party during voice communication.

The controller 110 is configured as a computer including a CPU and a memory to control the entire operations of the smartphone 100. The controller 110 serves as a route search requester 112 and a route guide 114 by execution of a computer program recorded in the memory by the CPU.

The route search requester 112 makes a request to search a recommended route between two different points specified by the user (place of departure and destination) to the route search apparatus 200 via the wireless communicator 120. In the description below, this request is called "route search request". The route search apparatus 200 sends route information indicating a route from the specified place of departure to the specified destination, in response to this route search request. When receiving the route information from the route search apparatus 200, the route search requester 112 stores the received route information into the storage part 138.

The route guide 114 displays a route on the display 126 using the route information stored in the storage part 138 and displays the current location identified by the GPS receiver 136 on the display 126, so as to inform the user of the smartphone 100 of the route.

The route search apparatus 200 includes a communicator 202, a controller 204 and a road information storage part 210. The communicator 202 is configured to make communication with the smartphone 100 via the Internet 80. The road information storage part 210 stores road network data that indicates the linkage of roads by nodes representing intersections and dead ends and links representing roads. A unique ID is assigned to each of the nodes and each of the links.

The controller 204 is configured to include a CPU and a memory and control the entire operations of the route search apparatus 200. The controller 204 serves as a route searcher 206 by execution of a computer program stored in the memory by the CPU. The computer program may be recorded in any of various recording media.

When receiving the route search request from the smartphone 100 via the communicator 202, the route searcher 206 searches a route by application of the known Dijkstra's algorithm using road information stored in the road information storage part 210. The route searcher 206 then sends route information indicating a searched route to the smartphone 100 via the communicator 202.

The road information storage part 210 stores road information including road network data consisting of nodes and links representing a road network, and link information 216 associated with the respective links. The link information 216 includes single link information and composite link information. The single link information denotes information provided to one road (link) that is located between two adjacent nodes. The composite link information, on the other hand, denotes information provided to a road across one or more nodes and more specifically a road district consisting of two or more continuous roads (link array).

Figure 2:
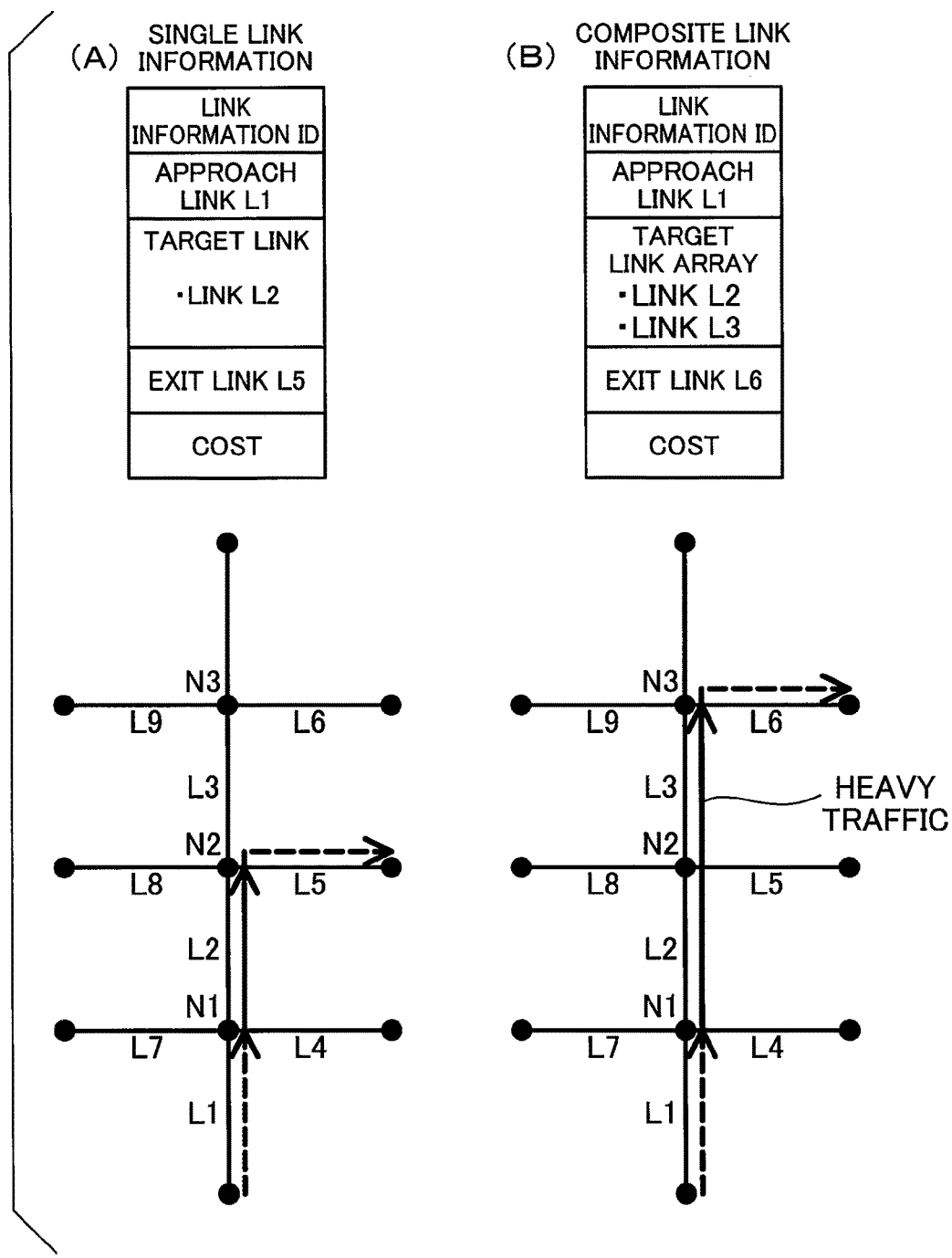
FIG. 2 is a diagram illustrating the data structures of link information.

FIG. 2 is a diagram illustrating the data structures of the link information (single link information and composite link information). As shown in the upper part of FIG. 2(A), the single link information includes a "link information ID", an ID of a "target link", an ID of an "exit link", an ID of an "approach link", and a "cost". The "link information ID" is a unique ID assigned to each piece of single link information. The "target link" represents one road that is located between adjacent roads. The "exit link" represents a road that exits from one end of the road represented by the target link. The "approach link" represents a road that approaches to the other end of the road represented by the target link. The "cost" indicates an average travel time required for entering the target link from the approach link and exiting to the exit link. In the lower part of FIG. 2(A), a target link L2 that is located between a node N1 and a node N2 is shown by the solid line, and an approach link L1 approaching to the target link L2 and an exit link L5 exiting from the target link L2 are respectively shown by the broken line. One piece of single link information is stored corresponding to one combination of the approach link and the exit link. For example, with regard to one road (double-lane road) that is located between two crossroads, nine (3×3) pieces of the single link information are stored corresponding to combinations of three approach links and three exit links.

As shown in the upper part of FIG. 2(B), the composite link information includes a "link information ID", a "target link array", an ID of an "exit link", an ID of an "approach link", and a "cost". The "link information ID" is a unique ID assigned to the composite link information. The "target link array" represents a road across one or more node and consists of IDs assigned to a plurality of links. The "exit link" represents a road that exits from one end of the road represented by the target link array. The "approach link" represents a road that approaches to the other end of the road represented by the target link array. The "cost" indicates an average travel time required for entering the target link array from the approach link and exiting to the exit link. In the lower part of FIG. 2(B), a target link array L2-L3 that is located between a node N1 and a node N3 is shown by the solid line, and an approach link L1 approaching to the target link array L2-L3 and an exit link L6 exiting from the target link array L2-L3 are respectively shown by the broken line.

The composite link information is not stored corresponding to all the combinations of approach links and exit links. In principle, the composite link information is stored corresponding to a road district which affects the entire target link array in the event of heavy traffic. In the description below, each link indicated by the composite link information is called "composite link".

Figure 3:
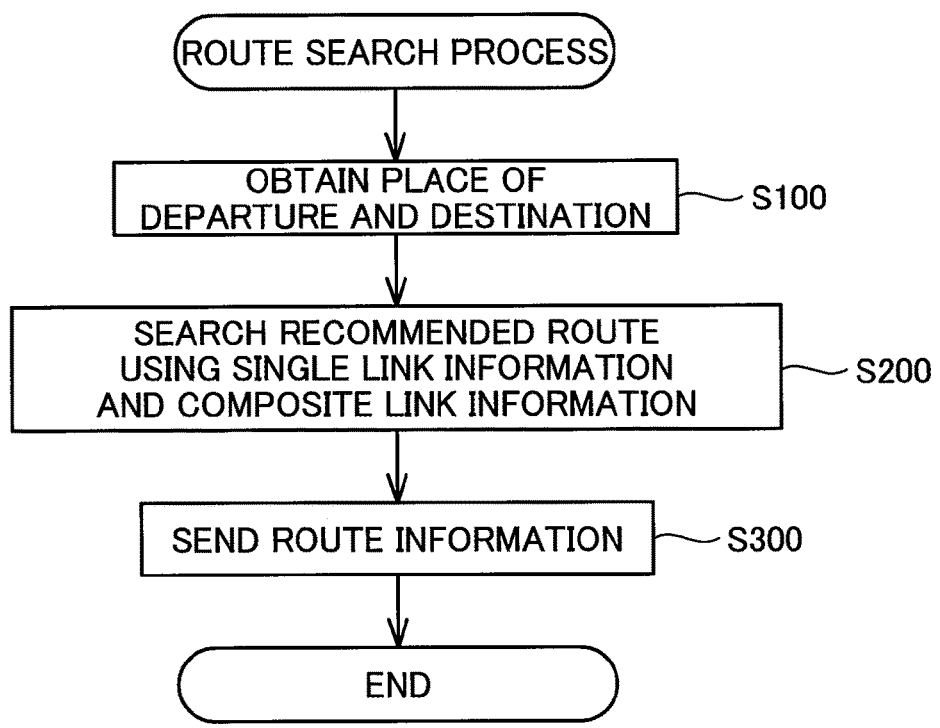
FIG. 3 is a flowchart showing a route search process.

FIG. 3 is a flowchart showing a route search process performed by the route search apparatus 200. The controller 204 of the route search apparatus 200 first receives a route search request from the route search requester 112 of the smartphone 100 via the communicator 202 (step S100). This route search request includes information indicating a place of departure and a destination. The user may specify the place of departure and the destination using a predetermined GUI (graphical user interface) displayed on the display 126 of the smartphone 100.

When receiving the route search request, the route searcher 206 searches a recommended route linking the place of departure and the destination specified by the route search request using the single link information and the composite link information stored in the road information storage part 210 (step S200). More specifically, the route searcher 206 extends a search tree through the nodes and the links from the place of departure to the destination, provides a node of interest ahead of the search tree with candidate labels, each indicating a cumulative cost and the search tree (i.e., previous label) to the node of interest, and selects and fixes a label that satisfies a predetermined condition (label having a minimum cost according to this embodiment) among the provided candidate labels, so as to determine a recommended route. On completion of the route search, the route searcher 206 sends route information indicating the searched route to the smartphone 100 (step S300).

Figure 4:
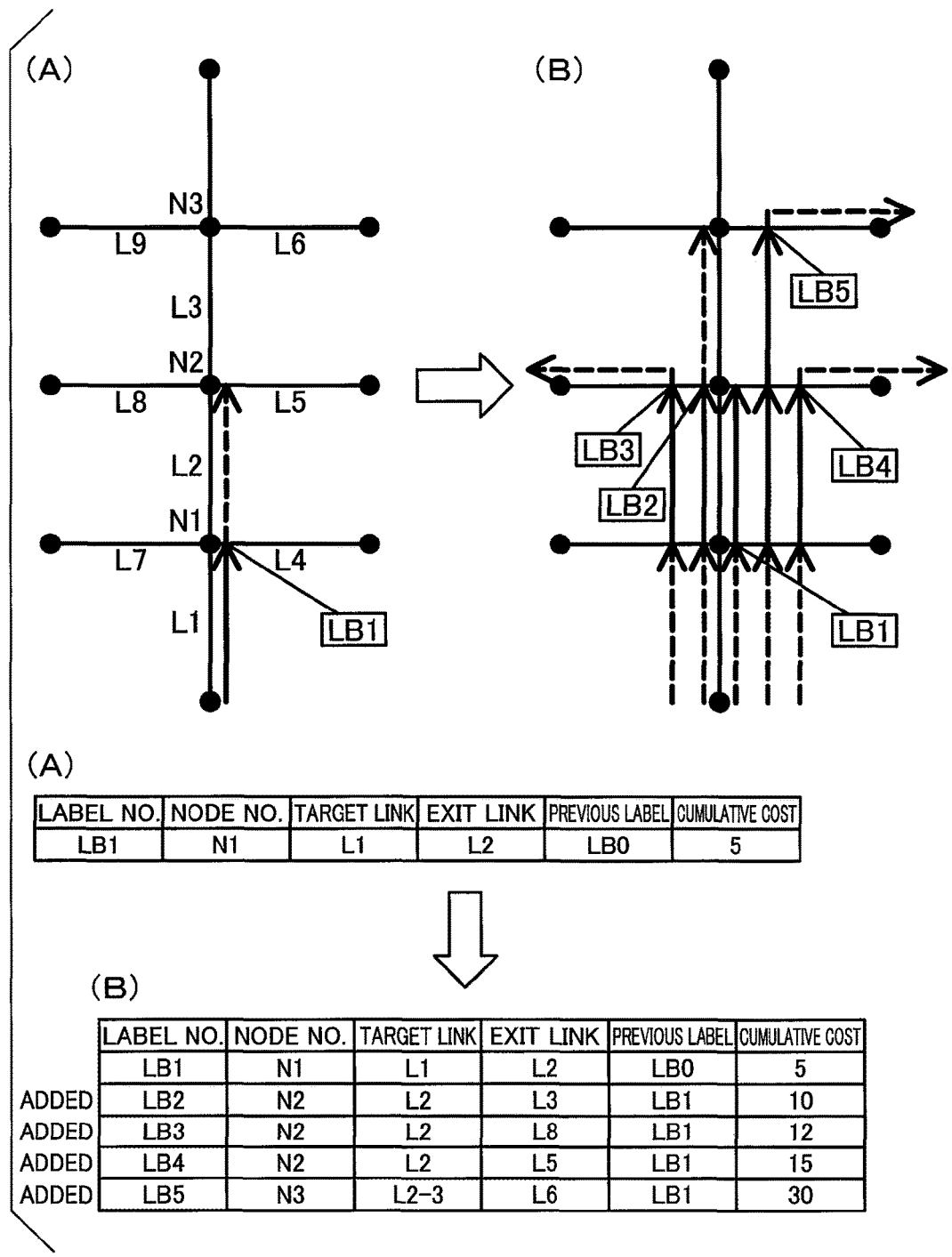
FIG. 4 is a diagram illustrating a concrete example of extending a search tree.

FIG. 4 is a diagram illustrating a concrete example of extending the search tree in the route search process of the embodiment. According to this embodiment, pieces of information regarding a label number, a node number, a target link, an exit link, a previous label number and a cumulative cost are recorded in a label provided to each node, based on the link information shown in FIG. 2. It is assumed that a label LB1 (target link=link L1, exit link=link L2) provided to the node N1 has been fixed in advance as shown in FIG. 4(A). The route searcher 206 then extends the search tree to a node ahead of the exit link L2 of the label LB1. More specifically, the route searcher 206 obtains link information (single link information or composite link information) that includes the exit link L2 of the label LB1 as its target link and the target link L1 of the label LB1 as its approach link from the road information storage part 210, and provides candidate labels to a node ahead of the extended search tree, based on the obtained link information. In the illustrated example of FIG. 4(B), candidate labels LB2, LB3 and LB4 are provided to a node N2, based on the single link information, and a candidate label LB5 is provided to a node N3, based on the composite link information. The labels LB2, B3 and LB4 have a common target link L2 and different exit links. The label LB5 includes two target links L2 and L3 and a link L6 as the exit link.

Figure 5:
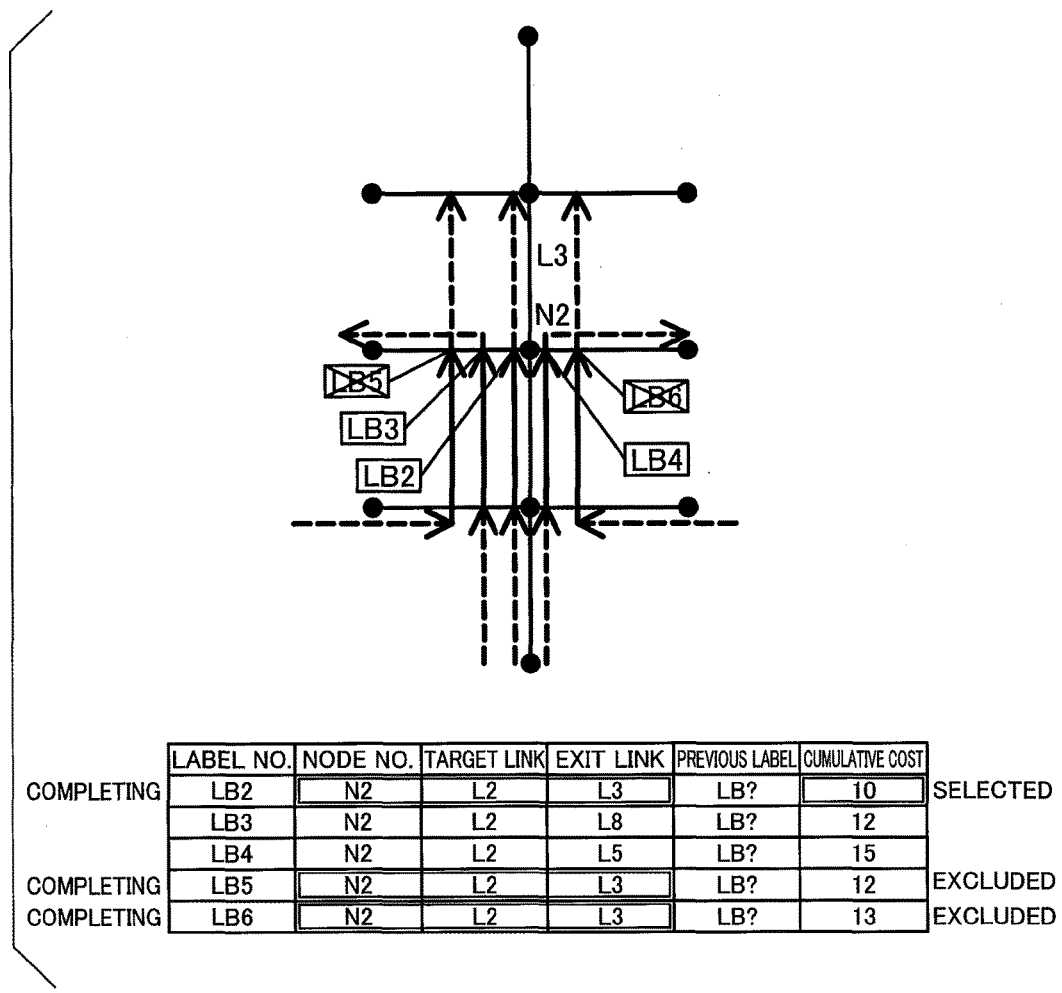
FIG. 5 is a diagram illustrating a method of excluding any unnecessary label.

FIG. 5 is a diagram illustrating a method of excluding any unnecessary label from candidate labels provided to a node of interest in the route search process of the embodiment. When labels having competing combinations of the target link and the exit link are provided to the node of interest, the route searcher 206 compares their cumulative costs and selects a label having the minimum cumulative cost as a candidate label of the node of interest. Any unselected label is excluded from the candidate labels. This prevents the search tree from being extended from a label having the large cost any longer. In the illustrated example of FIG. 5, labels LB2, LB5 and LB6 provided to a node N2 have competing combinations of the target link (link L2) and the exit link (link L3). The route searcher 206 accordingly compares the cumulative costs of these labels and selects the label LB2 having the minimum cumulative cost as a candidate label while excluding the other labels LB5 and LB6 from the candidate labels.

The first embodiment extends the search tree from the place of departure to each node and successively fixes a label having the minimum cost among candidate labels provided to each node according to the technique shown in FIGS. 4 and 5. A route connecting the target links included in the fixed labels is searched as a recommended route. In the first embodiment, the link information stored in the road information storage part 210 has the characteristics described below.

Figure 6:
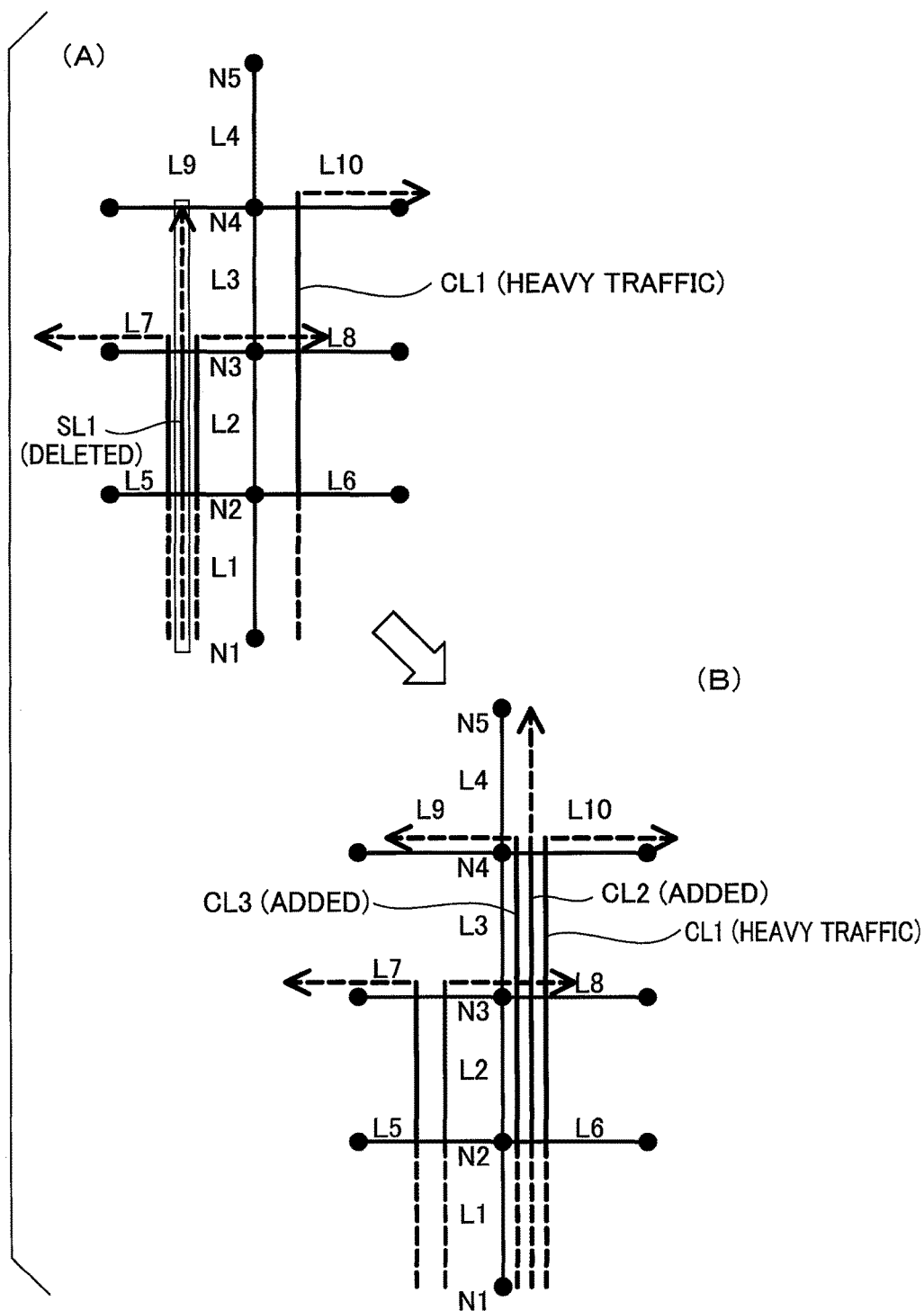
FIG. 6 is a diagram illustrating the characteristics of link information stored in a road information storage part.

FIG. 6 is a diagram illustrating the characteristics of the link information stored in the road information storage part 210 according to this embodiment. In this embodiment, when a piece of composite link information (CL1) is stored with regard to a certain road district (link L2-L3) as shown in FIG. 6(A), other pieces of composite link information (CL2 and CL3) that differ from the composite link information (CL) by only an exit link but have the same approach link and target link array as those of the composite link information (CL1) as shown in FIG. 6(B) are also stored in the road information storage part 210, irrespective of whether the traffic is heavy in a district shown by these pieces of composite link information (CL2 and CL3).

Additionally, according to this embodiment, when the composite link information (CL1) is recorded with regard to a certain road district, single link information (SL) or composite link information included in the composite link information (CL1) is deleted in advance as shown in FIG. 6(A) and is not stored in the road information storage part 210 as shown in FIG. 6(B). In the description of the embodiment, "link information A included in link information B" means that the approach link of the link information A is identical with the approach link of the link information B and that the exit link and all the target links of the link information B are included in the target link array of the link A.

Figure 7:
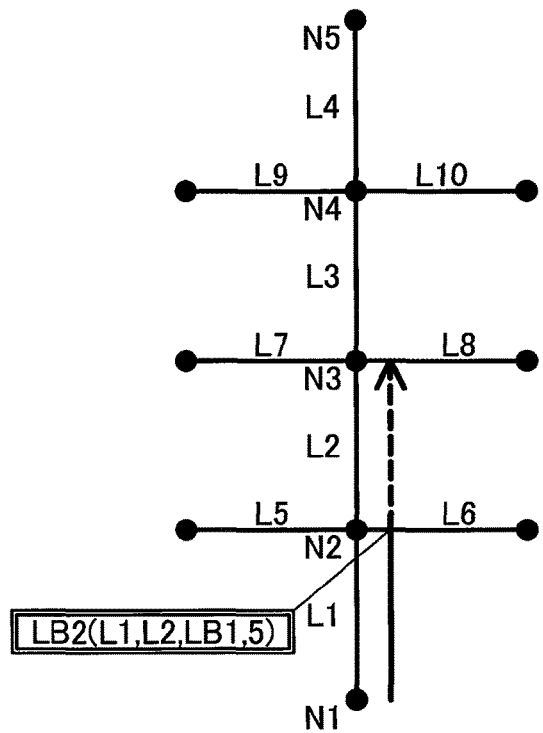
FIG. 7 is a diagram illustrating a concrete example of route search using the link information shown in FIG. 6.

FIGS. 7 to 10 are diagrams illustrating a concrete example of route search using the link information shown in FIG. 6. As shown in FIG. 7, it is assumed that a label LB2 (target link=link L1, exit link=link L2) provided to a node N2 has been fixed. The route searcher 206 then extends the search tree from the fixed label LB2. Link information (single link information and composite link information) that includes the target link L1 of the label LB2 as its approach link and the exit link L2 of the label LB2 as part of its target link is obtained from the road information storage part 210. In the illustrated example of FIG. 8, three different pieces of composite link information including links L2 and L3 as their target links and having different exit links are obtained. Labels LB3, LB4 and LB5 are provided to a node N4, based on these pieces of composite link information. These pieces of composite link information are stored in advance in the road information storage part 210 as shown in FIG. 6(B). In the illustrated example of FIG. 8, two different pieces of single link information including the link L2 as its target link and having different exit links are also obtained. Labels LB6 and LB7 are provided to a node N3, based on these pieces of single link information. The obtained single link information does not include the link information that is included in the simultaneously obtained composite link information. This is because the link information included in the composite link information is not stored in the road information storage part 210 as shown in FIG. 6(B).

Figure 8:
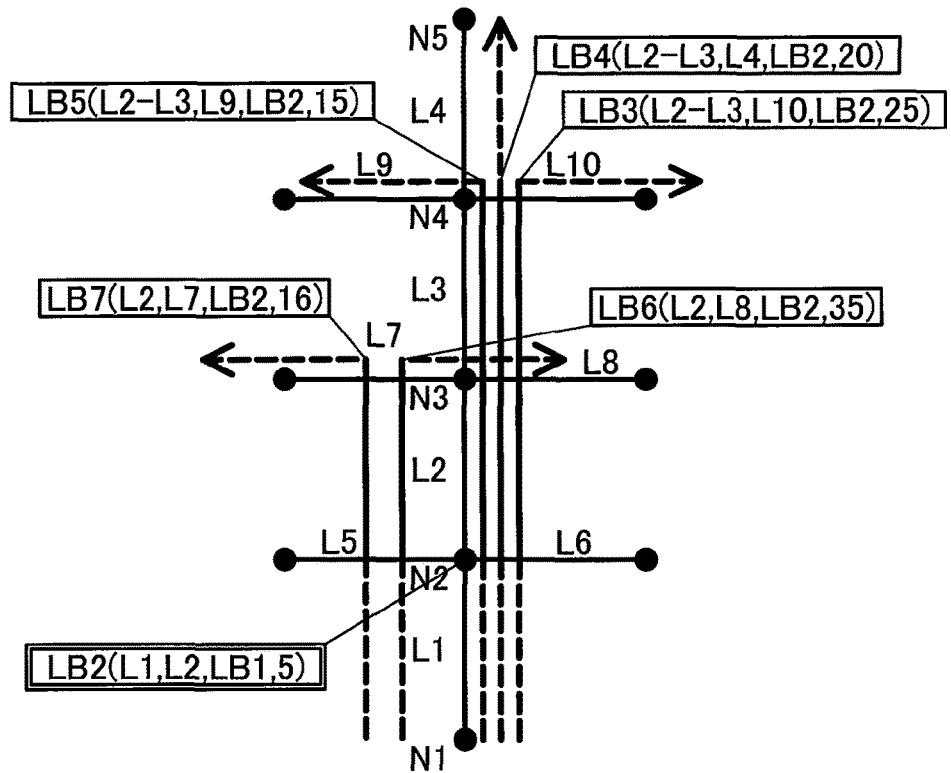
FIG. 8 is a diagram illustrating the concrete example of route search using the link information shown in FIG. 6.
Figure 9:
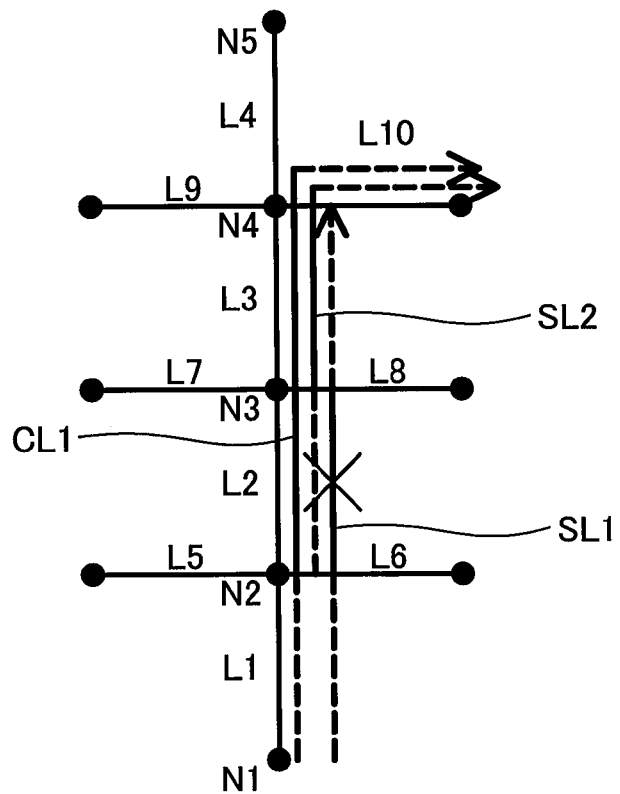
FIG. 9 is a diagram illustrating the concrete example of route search using the link information shown in FIG. 6.
Figure 10:
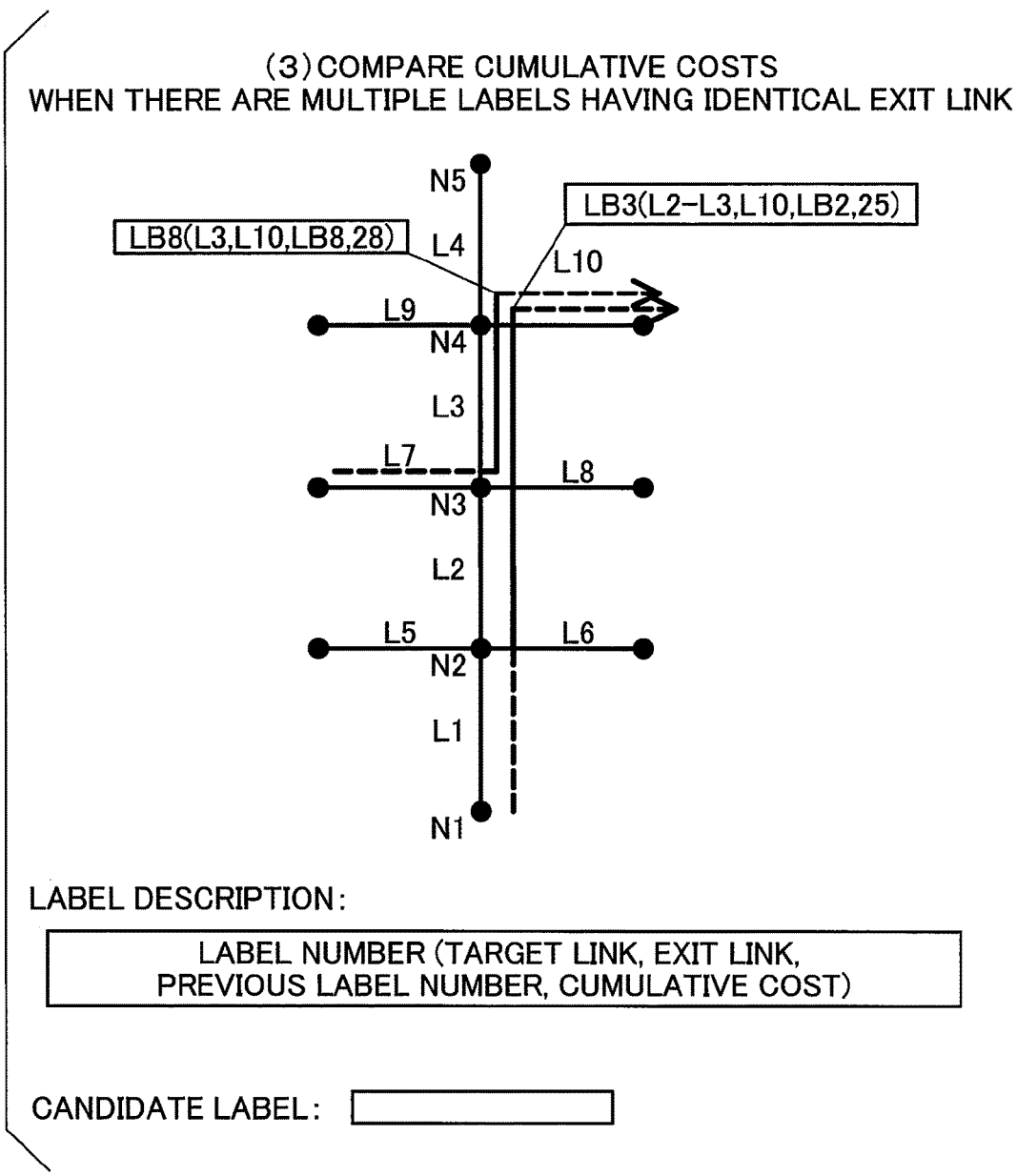
FIG. 10 is a diagram illustrating the concrete example of route search using the link information shown in FIG. 6.

As described above, according to this embodiment, the single link information included in the composite link information is not stored in the road information storage part 210, so that no label is provided to a node based on the single link information included in the composite link information. Single link information SL1 included in composite link information CL as shown in FIG. 9 is accordingly not obtained in the illustrated example of FIG. 8. In the state of FIG. 8, the search tree is not extended from multiple consecutive pieces of link information SL1 and SL2 as shown in FIG. 9. Accordingly, only the labels LB3, LB4 and LB5 corresponding to the composite link information are candidate labels provided to the node N4 at this stage. When a label LB8 extended from a different route is provided to the note of interest N4, the route is selected as the result of comparison between the cumulative costs of the label LB3 and the label LB8.

The first embodiment described above has the following advantageous effects. The composite link information is stored with regard to a district where the traffic is heavy. The cost of a route expressed by a piece of composite link information is thus generally larger than the total cost of multiple pieces of single link information included in the route. In the case of comparison between the cost based on composite link information and the cost based on multiple pieces of single link information with regard to a certain district, it is unlikely to select the composite link information that reflects the influence of heavy traffic but it is likely to select the multiple pieces of single link information. This causes the cost of the composite link information reflecting the influence of heavy traffic not to be used for a route search. According to this embodiment, however, the link information included in the composite link information is not stored in the road information storage part 210 as shown in FIG. 6. Accordingly a district expressed by composite link information is not expressed by a combination of multiple pieces of link information corresponding to shorter districts. This causes the cost set in the composite link information to be appropriately reflected in route search and thereby enables a route that avoids the heavy traffic to be appropriately searched. This embodiment performs the route search using the composite link information that collectively assigns the cost to multiple links, in addition to the single link information. Even when a right-turn congestion, a left-turn congestion or the like affects multiple links, this configuration enables an optimum route to be searched, based on the accurate cost (travel time). Additionally, according to this embodiment, the link information included in the composite link information is deleted in advance from the road information storage part 210. This allows for a route search without any special processing.

Figure 11:
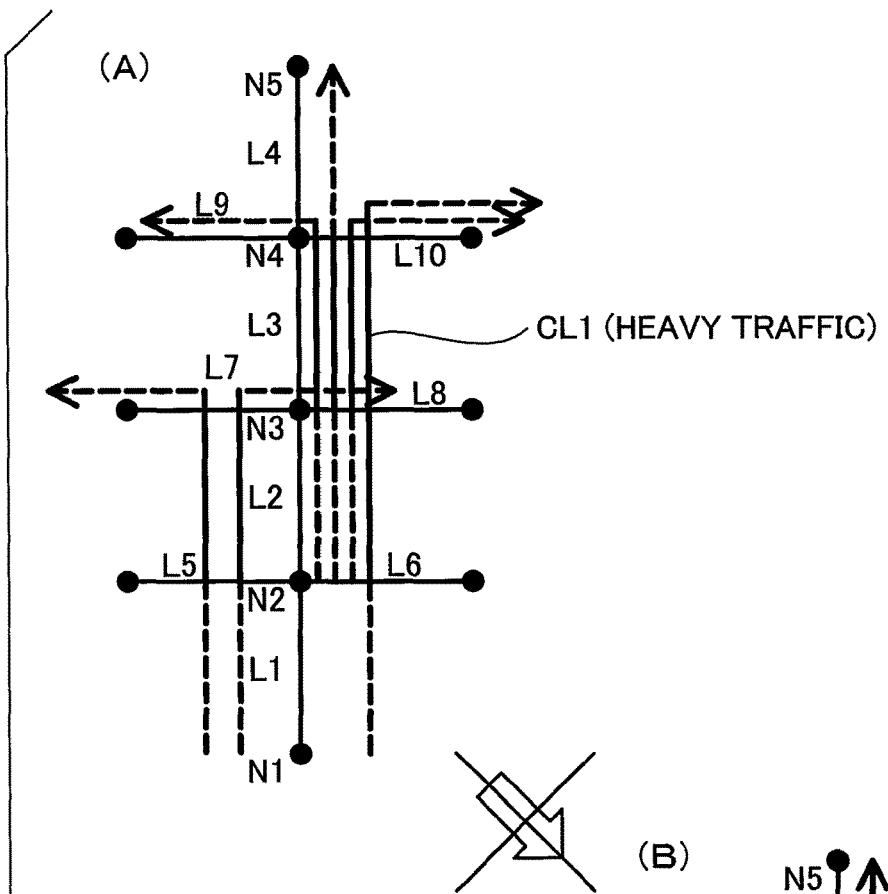
FIG. 11 is a diagram illustrating advantageous effects of a first embodiment.
Figure 11:
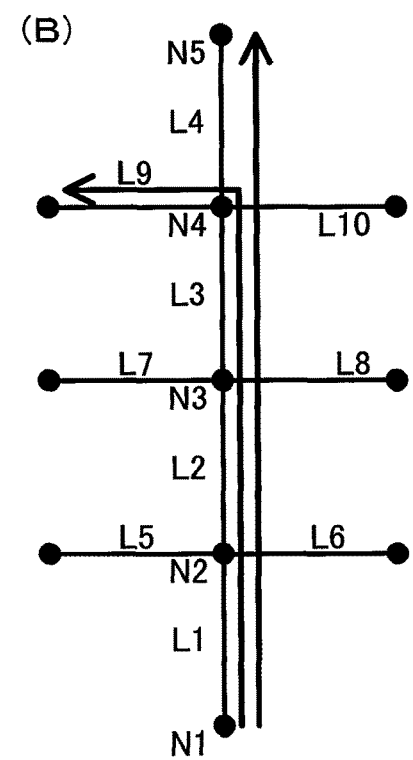
Figure 12:
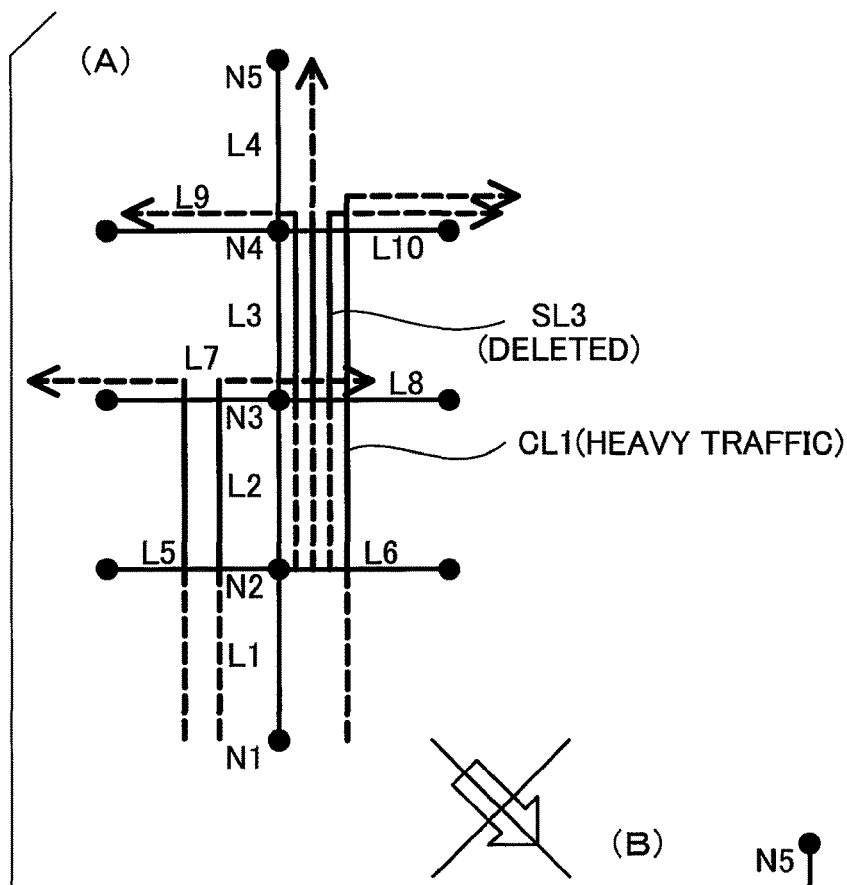
FIG. 12 is a diagram illustrating advantageous effects of the first embodiment.
Figure 12:
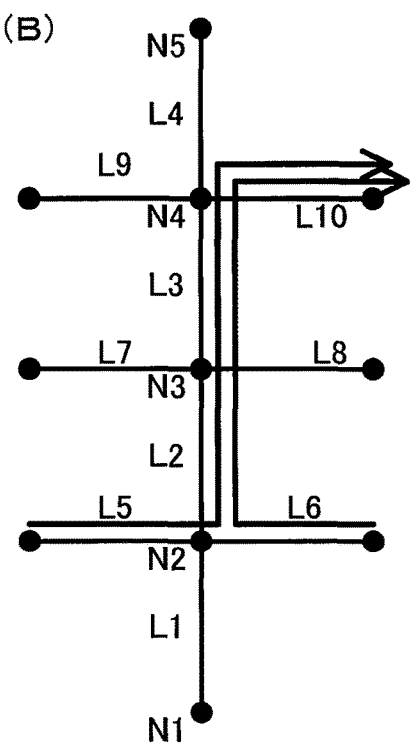

FIGS. 11 and 12 are diagrams illustrating other advantageous effects of the first embodiment. According to this embodiment, when a piece of composite link information with regard to a district where the traffic is heavy is stored in the road information storage part 210, other pieces of composite link information having different exit links are stored in addition to the piece of composite link information as shown in FIG. 6(B). If only a piece of composite link information CL1 is stored with regard to a district where the traffic is heavy but other pieces of composite link information having different exit links are not stored as shown in FIG. 11(A), it is impossible to search a route shown in FIG. 11(B) (route including an identical approach link with that of the composite link information CL1 and a different exit link from that of the composite link information CL1), due to deletion of link information included in the composite link information CL1. According to this embodiment, however, the pieces of composite link information CL2 and CL3 shown in FIG. 6(B) are also stored in the road information storage part 210. This configuration allows for appropriate search of the route shown in FIG. 11(B) using these pieces of composite link information.

According to this embodiment, the link information included in the composite link information is deleted in advance. As described above, "link information A included in link information B" means that the "approach link" of the link information A is identical with the "approach link" of the link information B and that the exit link and all the target links of the link information B are included in the target link array of the link A. For example, in the case of deletion of link information (SL3) that includes an identical "exit link (L10)" with that of the composite link information (CL1) and has a target link that is included in the target link array of the composite link information (CL1) as shown in FIG. 12(A), it is impossible to search a route shown in FIG. 12(B) (route that differs from a route expressed by the composite link information by only the approach link). This embodiment does not specify the identical exit link but specifies the identical approach link as the condition of "inclusion". This configuration allows for appropriate search of the route that differs from the route expressed by the composite link information by only the approach link.

B. Second Embodiment

A second embodiment does not employ the characteristics of the link information shown in FIG. 6. More specifically, in the second embodiment, composite link information is not stored in the road information storage part 210 unless a road district expressed by the composite link information is a road district having the possibility of heavy traffic. Link information included in the composite link information is not deleted in advance from the road information storage part 210 but is kept in the road information storage part 210.

A route search system 10 of the second embodiment has the configuration similar to that of the first embodiment and is thus not described in detail. The second embodiment differs from the first embodiment by part of the process of step S200 (process of searching using the single link information and the composite link information stored in the road information storage part 210) in the route search process shown in FIG. 3. The following describes the process different from that of the first embodiment.

Figure 13:
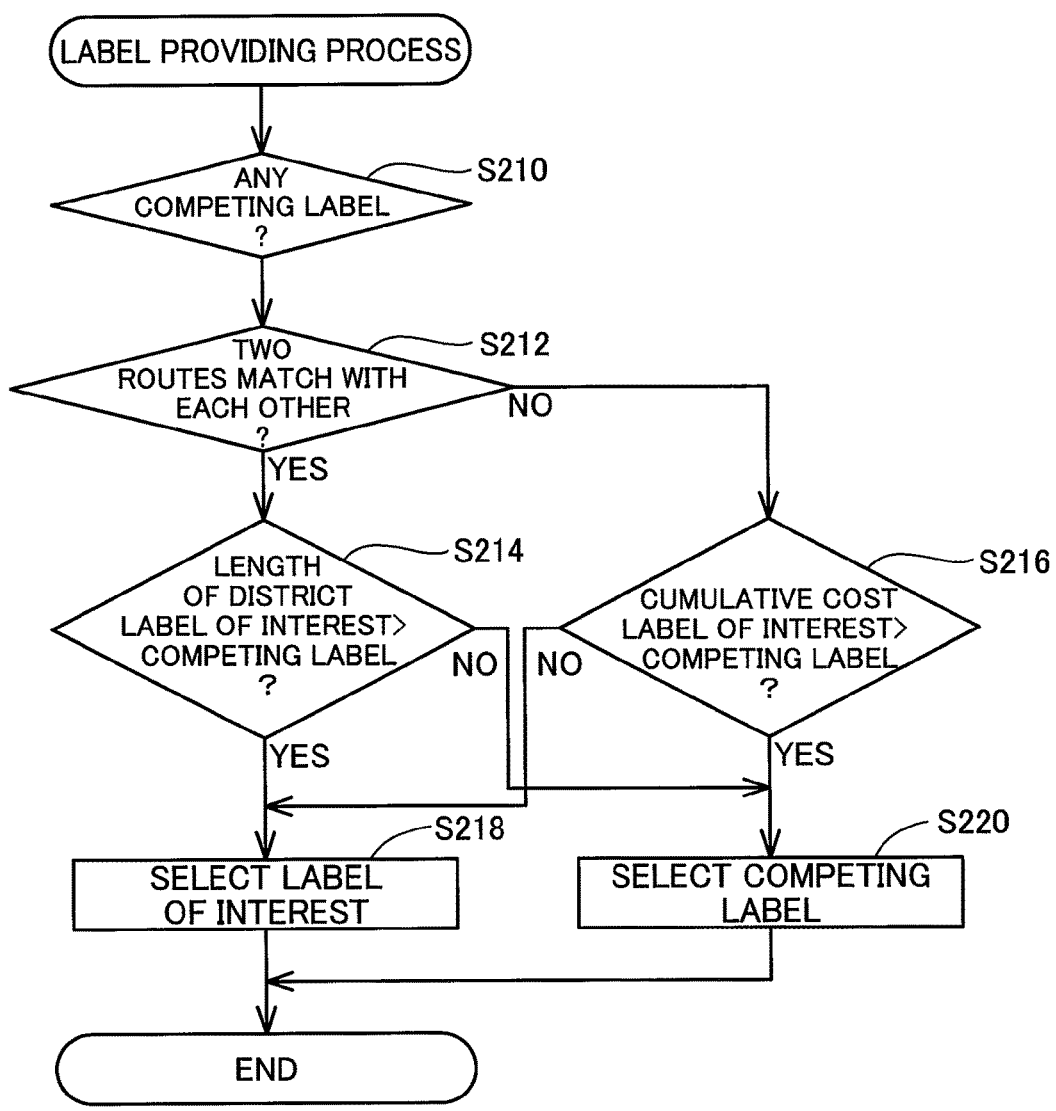
FIG. 13 is a flowchart showing a label providing process according to a second embodiment.

FIG. 13 is a flowchart showing a label providing process performed in a route search process of the second embodiment. The label providing process denotes a process of providing a candidate label to a node of interest. The route searcher 206 first determines whether a label that competes (competing label) has already been provided to a node of interest that is a target for providing a label (step S210). The competing label denotes a label that is provided to the same node to which a label (label of interest) is supposed to be provided and that has the same combination of the target link entering the node and the exit link exiting from the node. When there is any competing label, the route searcher 206 determines whether a route to the node of interest by the label of interest matches with a route by the competing label (step S212). Matching the route to the node of interest indicates a relationship that the target ink and the approach link of the other label are included in the target link and the approach link of one label. This relationship shows that the label of interest and the competing label have the same route so far. The process of step S212 does not need to determine whether the entire routes to the node of interest of these labels match with each other. This ensures efficient route search.

When the route by the label of interest does not match with the route by the competing label (step S212: NO), the route searcher 206 compares the cumulative cost of the label of interest with the cumulative cost of the competing label (step S216). When the result of comparison shows that the competing label has the smaller cumulative cost than the label of interest (step S216: YES), the route searcher 206 selects the competing label as a candidate label and excludes the label of interest from the candidate labels (step S220). When the label of interest has the smaller cumulative cost than the competing label (step S216: NO), on the other hand, the route searcher 206 selects the label of interest as a candidate label and excludes the competing label from the candidate labels (step S218). When the route by the label of interest does not match with the route by the competing label, this embodiment compares the cumulative costs to select the candidate label, like the first embodiment.

When the route by the label of interest matches with the route by the competing label (step S212: YES), on the other hand, the route searcher 206 compares the length of a district of the label of interest with the length of a district of the competing label (step S214). When the result of comparison shows that the label of interest has the longer district than the competing label (step S214: YES), the route searcher 206 selects the label of interest as a candidate label and excludes the competing label from the candidate labels (step S218). When the competing label has the longer district than the label of interest (step S214: NO), on the other hand, the route searcher 206 selects the competing label as a candidate label and excludes the label of interest from the candidate labels (step S220). The longer district suggests that the greater number of target links are included in link information (composite link information or single link information) corresponding to the label. For example, when link information corresponding to one label is composite link information and link information corresponding to the other label is single link information, the label corresponding to the composite link information is consistently selected as the candidate label.

Figure 14:
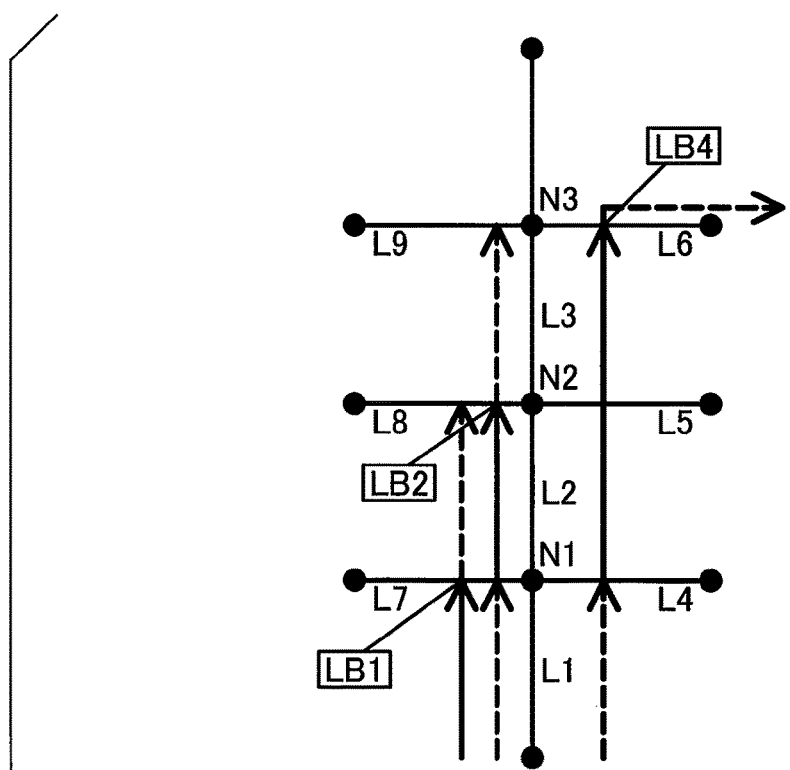
FIG. 14 is a diagram illustrating a concrete example of the label providing process.

FIGS. 14 to 17 are diagrams illustrating a concrete example of the label providing process shown in FIG. 13. It is assumed that a label LB1 has been fixed at a node N1 as a label that enters from a link L1 and exits to a link L2 as shown in FIG. 14. The route searcher 206 then extends the search tree from the node N1 in a direction of the exit link L2 of the label LB1 and obtains link information that includes the link L1 as its approach link and the link L2 as its target link, from the road information storage part 210. In the illustrated example of FIG. 14, as the result of extension of the search tree, a label LB4 is provided to a node N3, based on the composite link information, and a label LB2 is provided to a node N2, based on the single link information. In this state, the route searcher 206 fixes the label LB2 at the node N2 as a label that enters from the link L2 and exits to a link L3.

Figure 15:
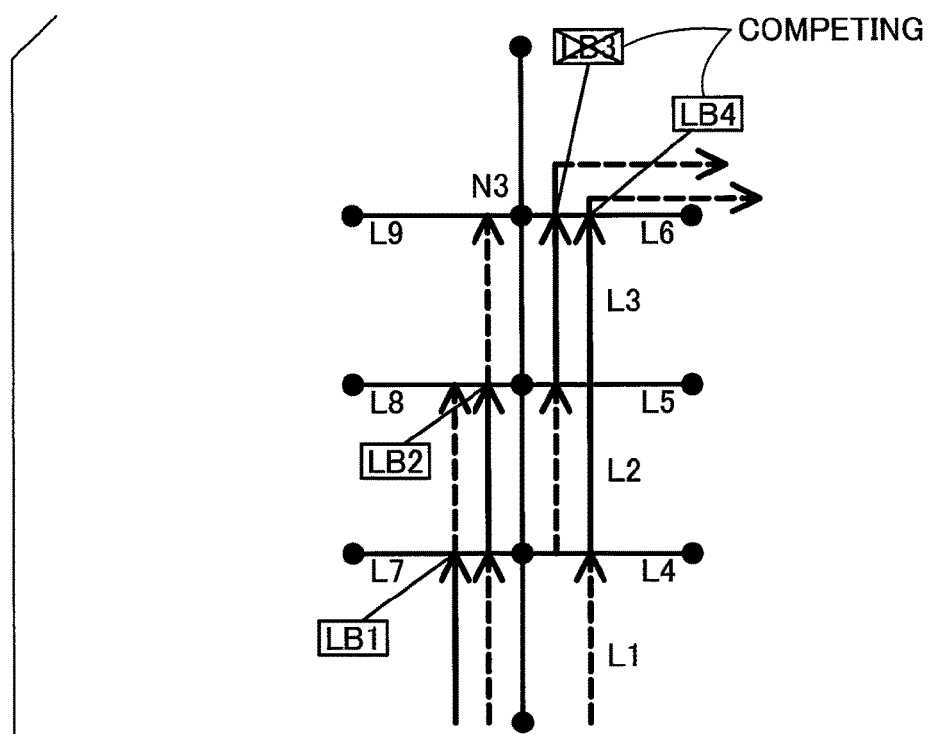
FIG. 15 is a diagram illustrating the concrete example of the label providing process.

After fixing the label LB2, the route searcher 206 extends the search tree from the label LB2 in a direction of the exit link L3 of the label LB2 and obtains, for example, single link information that includes the link L2 as its approach link, the link L3 as its target link and a link L6 as its exit link, from the road information storage part 210. The route searcher 206 then tries to provide a label LB3 to the node N3, based on the obtained single link information, as shown in FIG. 15. The node N3, however, has a previously provided label LB4 including the same combination of the target link entering the node N3 and the exit link exiting from the node N3. Accordingly the label LB4 is a competing label of the label LB3 of interest (step S210: YES in FIG. 13). Since the route by the label of interest LB3 matches with the route by the competing label LB4 (step S212: YES in FIG. 13), the competing label LB4 having the longer district is selected as a candidate label, while the label of interest LB3 having the shorter district is excluded from the candidate labels (step S214 in FIG. 13).

Figure 16:
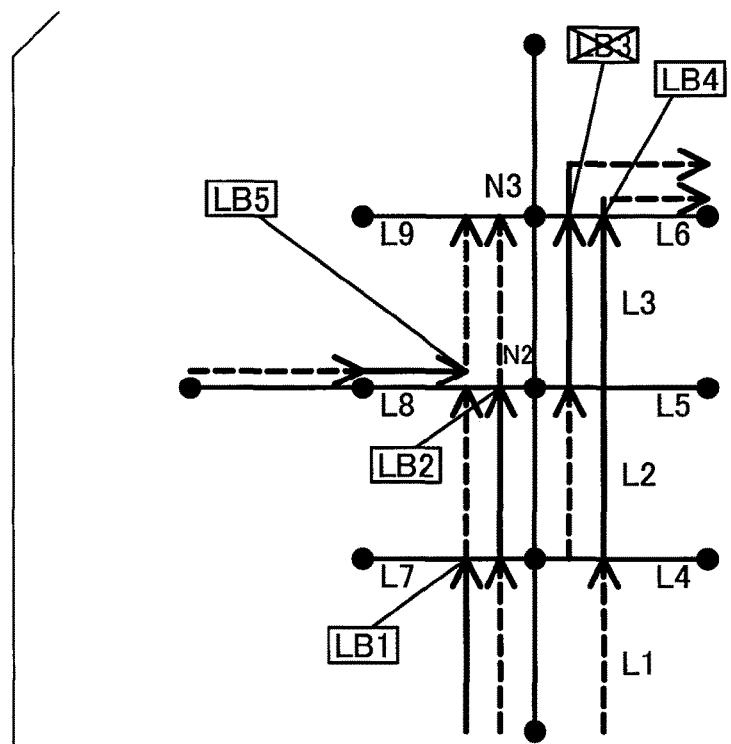
FIG. 16 is a diagram illustrating the concrete example of the label providing process.
Figure 17:
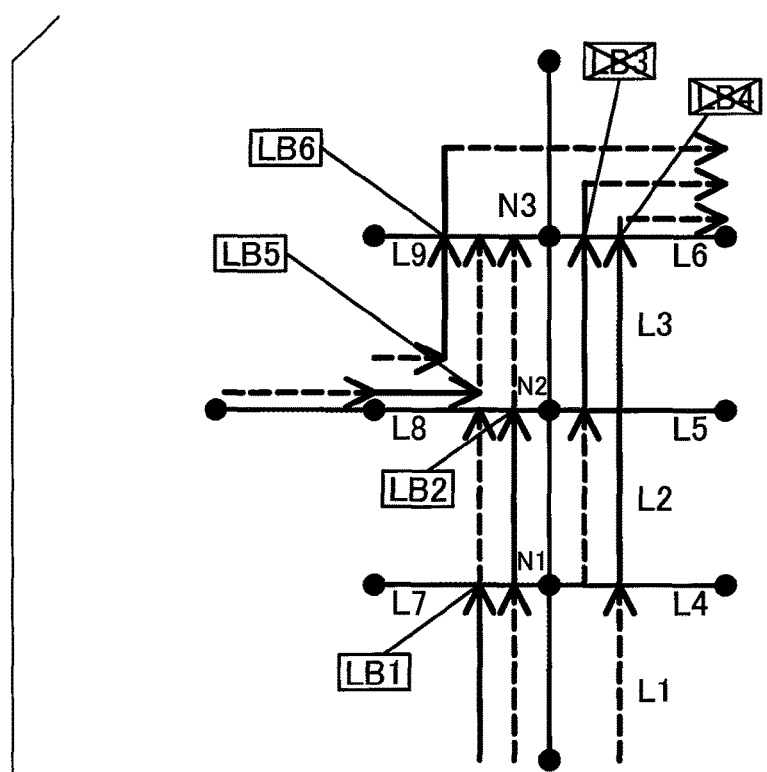
FIG. 17 is a diagram illustrating the concrete example of the label providing process.

It is subsequently assumed that a label LB5 including a link L8 as its target link and the link L3 as its exit link is provided to the node N2 and is fixed as shown in FIG. 16. The route searcher 206 then extends the search tree from the label LB5 in a direction of the exit link L3. As a result, the route searcher 206 tries to provide a label LB6 including the link L8 as its approach link, the link L3 as its target link and the link L6 as its exit link to the node N3, as shown in FIG. 17. The node N3 already has the label LB4 competing with the label LB6. The label LB6 and the label LB4 are competing (step S210: YES in FIG. 13), but their routes do not match with each other (step S212: NO in FIG. 13). The route searcher 206 then compares the cumulative cost of the label of interest LB6 with the cumulative cost of the competing label LB4 (step S216 in FIG. 13). In the illustrated example of FIG. 17, as the result of comparison, the label of interest LB6 is selected as a candidate label, and the competing label LB4 is excluded from the candidate labels.

According to the second embodiment described above, the label having the longer district, i.e., the label based on the composite link information having the cost reflecting the influence of heavy traffic, between the labels having the same exit link and the same route is provided as a candidate label to the node of interest. Like the first embodiment, the configuration of this embodiment causes the cost of the composite link information reflecting the influence of heavy traffic to be appropriately reflected in route search and thereby enables a route that avoids the heavy traffic to be appropriately searched. This embodiment also performs the route search using the composite link information that collectively assigns the cost to multiple links, in addition to the single link information. Even when a right-turn congestion, a left-turn congestion or the like affects multiple links, this configuration enables an optimum route to be searched, based on the accurate cost (travel time).

C. Modifications

In each of the embodiments described above, the travel time is related as the cost to each piece of link information. The cost is, however, not limited to the travel time. For example, the length of the road may be related as the cost. Different values may be related as the cost with regard to each day of the week and each time zone.

In the above embodiments, when a destination is located in the middle of a road expressed by link information, the cost of the link information may be divided according to the location of the destination between nodes and may be added to the cumulative cost to the node immediately before the destination. This enables the cost to the destination to be accurately determined.

In the above embodiments, the composite link information is stored with regard to consecutive road districts where the traffic is heavy. According to a modification, the composite link information may be stored with regard to consecutive road districts where the travel time is expected to be shorter.

In the above embodiments, the route search apparatus 20 performs route search, and the smartphone 100 performs route guidance. According to a modification, the smartphone 100 may be provided with the road information storage part 210 and the route searcher 206 and may perform route search alone. In this modification, the smartphone 100 corresponds to the route search apparatus of this application. The route search apparatus is not limited to the smartphone 100 but may be any of various devices including general cell phones, laptop computers, tablet terminals, portable digital assistants (PDA), portable music players, handheld game consoles, car navigation systems and PND (portable navigation devices). The link information stored in the road information storage part 210 may be recorded in any of various recording media.

The invention is not limited to any of the embodiments and modifications described above but may be implemented by a diversity of other configurations without departing from the scope of the invention. For example, the technical features of any of the embodiments and modifications corresponding to the technical features of each of the aspects described in Summary may be replaced or combined appropriately, in order to solve part or all of the problems described above. Any of the technical features may be omitted appropriately unless the technical feature is described as essential herein.

REFERENCE SIGNS LIST

10 route search system
70 communication carrier
80 Internet
100 smartphone
110 controller
112 route search requester
114 route guide
120 wireless communicator
124 touch panel
126 display
128 microphone
130 speaker
136 GPS receiver
138 storage part
200 route search apparatus
202 communicator
204 controller
206 route searcher
210 road information storage part
216 link information

The invention claimed is:

1. A route search apparatus, comprising:
a road information storage part configured to store road information including network data that includes nodes and links representing a road network, and link information related to a target link corresponding to one link; and
a controller configured to extend a search tree through the nodes and the links based on the road information, provide a node of interest ahead of the search tree with a cumulative cost to the node of interest, and fix a cumulative cost that satisfies a predetermined condition among cumulative costs provided to the node of interest, so as to search a recommended route between two different points, wherein
the link information includes information regarding an approach link that is a link approaching to a node at one end of the target link, an exit link that is a link exiting from a node at an other end of the target link, and a cost representing a travel time of the target link for entering from the approach link and exiting to the exit link, and
the controller obtains link information including an exit link of a fixed node that is a node having a cumulative cost fixed in advance as its target link and a target link reaching the fixed node as its approach link, from the road information and extends the search tree to a node that is located at the other end of the target link included in the obtained link information.

2. The route search apparatus according to claim 1, wherein the controller records information representing a target link, an exit link and a cumulative cost, based on the link information, in the node of interest ahead of the search tree.

3. The route search apparatus according to claim 2, wherein when pieces of information having competing combinations of a target link and an exit link are present at the node of interest, the controller compares cumulative costs of the competing pieces of information to fix the cumulative cost.

4. The route search apparatus according to claim 1, wherein when multiple pieces of link information having an identical exit link are present at the node of interest and routes by the multiple pieces of link information match with each other, the controller provides a cumulative cost to the node of interest, based on a cost of link information that includes a largest number of target links among the multiple pieces of link information.

5. The route search apparatus according to claim 4, wherein when one piece of link information and another piece of link information included in the multiple pieces of link information having the identical exit link have such a relationship that a target link and an approach link of the another piece of link information are included in a target link and an approach link of the one piece of link information, the controller determines that a route by the one piece of link information matches with a route by the another piece of link information.

6. A route search method comprising a route search process that refers to a road information storage part configured to store road information including network data that includes nodes and links representing a road network, and link information related to a target link corresponding to one link, extends a search tree through the nodes and the links based on the road information, provides a node of interest ahead of the search tree with a cumulative cost to the node of interest, and fixes a cumulative cost that satisfies a predetermined condition among cumulative costs provided to the node of interest, so as to search a recommended route between two different points, wherein
the link information includes information regarding an approach link that is a link approaching to a node at one end of the target link, an exit link that is a link exiting from a node at an other end of the target link, and a cost representing a travel time of the target link for entering from the approach link and exiting to the exit link, and
the route search process obtains link information including an exit link of a fixed node that is a node having a cumulative cost fixed in advance as its target link and a target link reaching the fixed node as its approach link, from the road information and extends the search tree to a node that is located at the other end of the target link included in the obtained link information.

7. A non-transitory computer readable storage medium storing a computer program that causes a computer to implement a route search function that refers to a road information storage part configured to store road information including network data that includes nodes and links representing a road network, and link information related to a target link corresponding to one link, extends a search tree through the nodes and the links based on the road information, provides a node of interest ahead of the search tree with a cumulative cost to the node of interest, and fixes a cumulative cost that satisfies a predetermined condition among cumulative costs provided to the node of interest, so as to search a recommended route between two different points, wherein
the link information includes information regarding an approach link that is a link approaching to a node at one end of the target link, an exit link that is a link exiting from a node at an other end of the target link, and a cost representing a travel time of the target link for entering from the approach link and exiting to the exit link, and
the route search function obtains link information including an exit link of a fixed node that is a node having a cumulative cost fixed in advance as its target link and a target link reaching the fixed node as its approach link, from the road information and extends the search tree to a node that is located at the other end of the target link included in the obtained link information.

8. A non-transitory computer readable storage medium storing a data structure of road information used for route search performed by a computer,
the road information including network data that includes nodes and links representing a road network, and link information related to a target link corresponding to one link, wherein
the link information includes information regarding an approach link that is a link approaching to a node at one end of the target link, an exit link that is a link exiting from a node at an other end of the target link, and a cost representing a travel time of the target link for entering from the approach link and exiting to the exit link, and
the route search obtains link information including an exit link of a fixed node that is a node having a cumulative cost fixed in advance as its target link and a target link reaching the fixed node as its approach link, from the road information and extends the search tree to a node that is located at the other end of the target link included in the obtained link information.

* * * * *